No. 769,520. PATENTED SEPT. 6, 1904.
H. C. WALDMANN.
WATER CLOSET.
APPLICATION FILED FEB. 1, 1904.
NO MODEL. 2 SHEETS—SHEET 2.
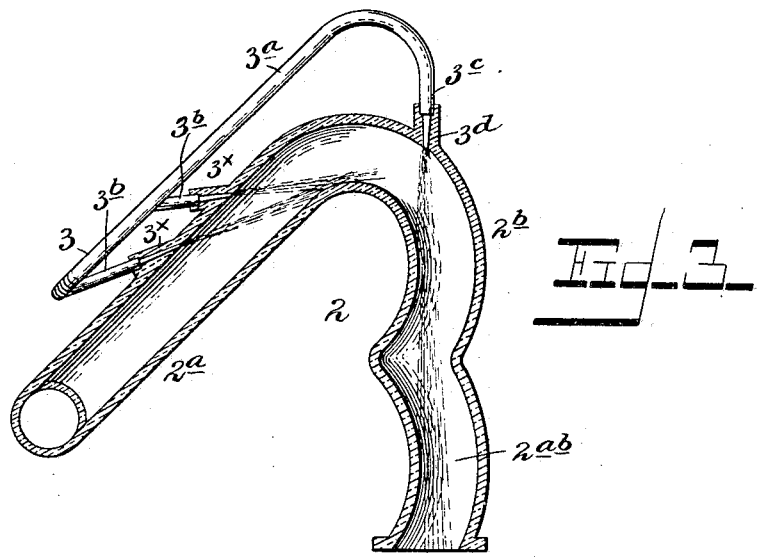
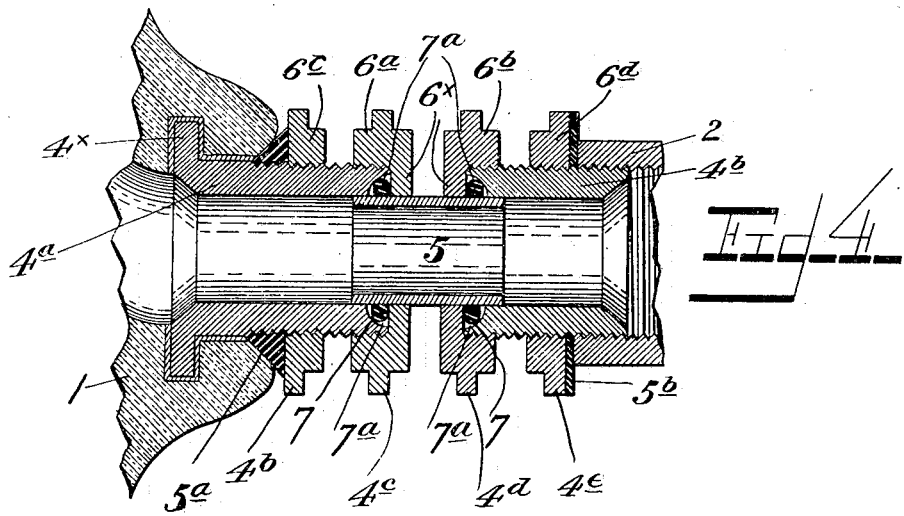
Inventor:
Henry C. Waldmann, No. 769,520.

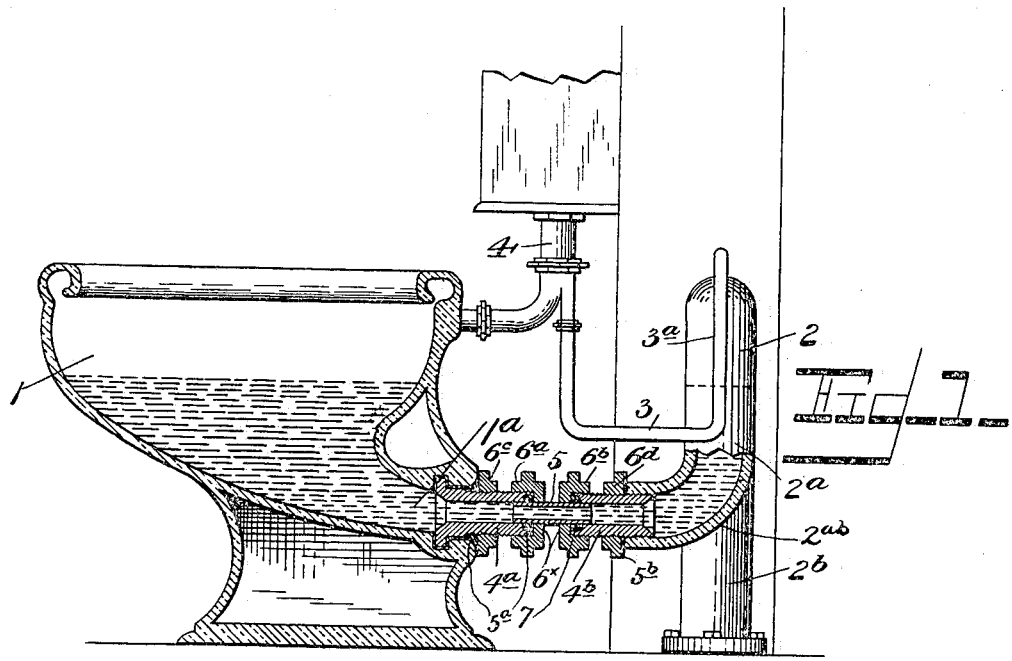
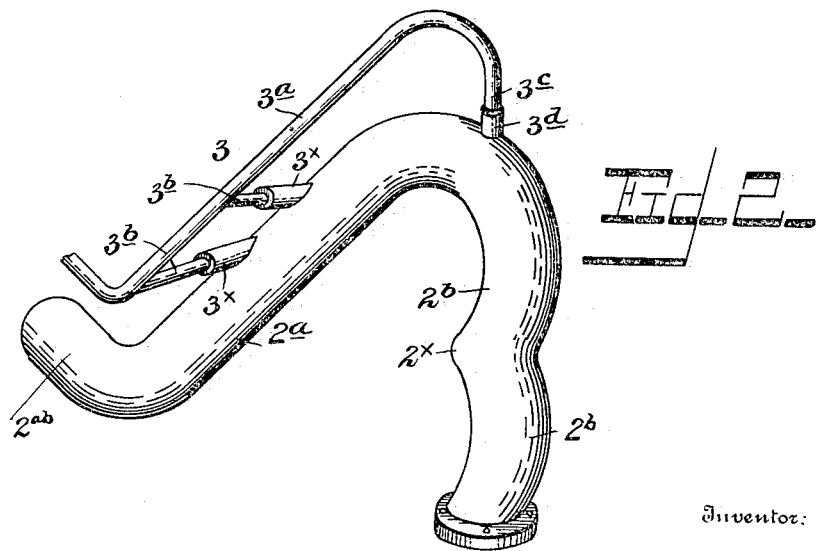
Inventor:
Henry C. Waldmann,

Patented September 6, 1904.

UNITED STATES PATENT OFFICE.

HENRY C. WALDMANN, OF KOKOMO, INDIANA, ASSIGNOR TO COLUMBIA POTTERY AND MANUFACTURING COMPANY, OF KOKOMO, INDIANA.

WATER-CLOSET.

SPECIFICATION forming part of Letters Patent No. 769,520, dated September 6, 1904.

Application filed February 1, 1904. Serial No. 191,561. (No model.)

*To all whom it may concern:*

Be it known that I, HENRY C. WALDMANN, a citizen of the United States, residing at Kokomo, in the county of Howard and State of Indiana, have invented certain new and useful Improvements in Water-Closets, of which the following is a specification.

My invention relates to improvements in water-closets, more particularly the siphon form, it being also applicable to urinals, lavatories, hoppers, &c.

Said invention has in view principally the below-noted objects: to render the trap readily accessible for cleaning or repairing; to produce the siphonic action wholly within the trap as differentiating from partially setting it up in the closet bowl or basin; to promote or intensify such siphonic action; to secure a thoroughly effective water seal for the basin or bowl, as well as to deepen relatively the amount of water in said bowl for aiding the effective flushing thereof, and otherwise to promote further convenience and facility of operation in addition to promoting simplicity and cheapening manufacture.

Said invention consists of certain structural features and combination and arrangement of parts, substantially as hereinafter more fully disclosed by the following description, and particularly pointed out by the claims concluding said description.

In the accompanying drawings, illustrating the preferred embodiment of my invention, Figure 1 is a sectional elevation thereof as applied for use. Fig. 2 is a detailed perspective view of the "fitting" or siphon with its water jetting or spraying attachment. Fig. 3 is a section at right angles to that of Fig. 1 produced through the siphon or fitting. Fig. 4 is a broken-away sectional view showing more especially the slip-joint connection between the closet-bowl and the fitting or siphon.

In the carrying out of my invention I employ a bowl or basin 1, preferably of the general outline indicated, with its outlet-passage $1^a$ stopping or terminating at a point within itself and the bottom of said bowl curving or sloping toward and in a continuous direct line with the bottom of the corresponding surface of said outlet-passage, the advantages of which are obvious.

Within the wall of the house or building I suitably arrange or dispose a fitting or siphon 2 of peculiar construction, the connection between which and said closet-bowl is effected, as presently explained, for conducting away or disposing of the contents of the latter after using. Said siphon or fitting consists of a pipe-section of suitable transverse sectional area for its intended purpose, having one or its ascending member or leg $2^a$ arranged or inclined upward at a certain angle—say about forty-five degrees—with its descending or other member, $2^b$, and uniting therewith at its upper end. The lower end or terminal $2^{ab}$ of the member or leg $2^a$ is turned or arranged at a right angle to the general plane thereof, as shown, to provide for the passage of said terminal or end through the side of the wall next to the closet-bowl, the purpose of which is apparent. The member or leg $2^b$ of said siphon or fitting has its lower end suitably connected to and in alinement with the soil-pipe for delivery thereinto. The legs or members $2^a, 2^b$ of the siphon are of about equal length, with their point of union or altitude reaching well upward, being about in the same horizontal plane with the upper edge of the closet-bowl, thus permitting the water to rise and stand high up into the latter. This arrangement provides an effective or thorough water seal as against the escape of odor, while the producing of the siphon action is wholly confined to the siphon as distinguished from relying upon the closet-bowl partly for that purpose, thus still further isolating or removing noises therefrom, to which the arrangement of the siphon, &c., in the wall also contributes. Said vertical member or leg $2^b$ of the siphon 2 is slightly crooked or has its upper portion curved or deflected somewhat toward the member $2^a$, with its lower or remaining portion oppositely deflected or curved, as at $2^\times$, to initially set up the siphonic action.

A pipe 3 of relatively tubular-like cross-section and preferably having a certain portion $3^a$ of its length arranged parallel with the inclined member or leg $2^a$ of the siphon or fitting 2 passes through the side of the wall facing the closet-bowl and thence extended and connected to the flushing-tank pipe 4, the latter connecting in the usual way with the said closet-bowl. Said portion $3^a$ of the pipe 3 has a number or plurality of nozzles or branches $3^b 3^b$, suitably entering jet nozzles or inlets $3^\times$ of the leg or member $2^a$ of the siphon or fitting 2, arranged so as to provide for the delivery of their respective water jets or spray into the latter at a common point, or the point of union between the two legs or members of said siphon or fitting, thus aiding to promote or intensify the siphonic action thereof in elevating the water up the ascending leg or member. Said pipe 3 has also one end directed downward, as at $3^c$, and entering a jet nozzle or inlet $3^d$ in the upper end of the vertical member or leg $2^b$ of the siphon 2 to deliver a jet or spray of water, also setting up a siphonic action in said member or leg, thus aiding or intensifying the previously-described like action of the water jets or spray delivered by the nozzles or pipes $3^b 3^\times$, intercepting the latter jet or spray. It is noted that the greater amount of water from the flushing-pipe is utilized for jetting or spraying purposes to aid the siphonic action, the lesser amount passing into the closet-bowl for flushing.

The connection between the closet-bowl and the fitting or siphon above noted is effected, preferably, by means of what I term a "slip-joint" comprising the below-recited parts. Exteriorly-screw-threaded sleeves or members $4^a 4^{ab}$ are secured to the outlet end of the closet-bowl and the inlet end of the fitting 2, respectively, one preferably by screw-thread connection, the connection between the member $4^a$ and closet-bowl, however, being effected by embedding in the latter lateral arms or prongs $4^\times$, formed on said member. Intermediately of said sleeves, with its ends inserted thereinto respectively, is a tube-section 5, thus constituting a passage-way for the contents of the closet-bowl to the siphon and soil-pipe. The members $4^a 4^b$ are equipped with nuts $6^a 6^b 6^c 6^d$, respectively, the nuts $6^a 6^b$ having each an annular inturned flange $6^\times$ engaging an elastic packing-ring 7, inserted into a corresponding recess $7^a$ in the outer end of each member, thus forming at each of these points an effective gas and water tight joint. Said nuts are provided with suitable angular shoulders $4^b 4^c 4^d 4^e$, respectively, for the application thereto of a wrench for suitably or conveniently manipulating said parts, as in assembling or uniting the same. The required air and gas tight joints for the closet-bowl and fitting are formed by rubber gaskets or packings $5^a 5^b$.

It will be noted that by the use of my invention the siphon or fitting, together with other parts, need not be arranged under the closet-floor, in which event the latter would have to be ripped up to gain access thereto, as in making repairs, while by the present arrangement they can be readily reached and the fitting is not required to be extended to the closet-bowl, or rather to its outlet, in connecting the same together, as it is impractical to effect direct connection between earthenware and iron or metal. Also these parts are enabled to be closely connected together, avoiding any unnecessary extending of the same to effect such connection therebetween. Said siphon is applicable also to urinals, lavatories, hoppers, &c., as well as to water-closets, and is adapted to be manufactured separately from any particular type of bowl or basin.

It will be understood that I do not limit myself as to details herein, as they may be changed without departing from the spirit of my invention and the latter still be protected.

I claim—

1. A water-closet bowl having a "siphon-fitting," with its legs arranged at an angle to each other, and a flush-water pipe having one end delivering into the upper part of said siphon, within the plane of the vertical or discharging leg or member and provided with arms delivering into the other of said legs, also into the upper part of said siphon-fitting.

2. A water-closet bowl having a "siphon-fitting" with its legs or members arranged at an angle to each other and the lower end terminal of one leg arranged at a right angle to the general plane of the "siphon-fitting," for the purpose aforesaid, and a flush-water pipe with one end delivering into the upper part of the latter, within the plane of the vertical or discharging leg or member, and provided with arms arranged to deliver into the other of said legs, also into said discharging-leg.

3. A water-closet bowl having the legs of its "fitting" arranged at an angle to each other and one leg provided with a nozzle opening within the plane thereof and the other leg provided with nozzles opening thereinto in a slightly-upward inclination, and a flush-water pipe, with one end entering the first-referred-to nozzle and provided with arms entering the latter nozzle, said flush-water pipe connecting with the bowl flush-water pipe.

4. A water-closet bowl having a "siphon-fitting" consisting of an inclined member and a vertical member uniting at their upper ends, a flush-water pipe connecting with the bowl-rim, said inclined and vertical members having nozzles, those of the former arranged in an upward inclination and that of the latter extending in the vertical plane of the member, and a branch pipe of said flush-water pipe having arms delivering via the nozzles of said former member into the upper part of said member, said branch pipe having its upper end connected with, and delivering into the nozzle of said vertical member.

In testimony whereof I have signed my name to this specification in presence of two witnesses.

HENRY C. WALDMANN.

Witnesses:
J. N. MILLER,
W. W. DRINKWATER.